(No Model.)
C. J. VAN DEPOELE.
UNDERGROUND CONDUIT FOR ELECTRIC RAILWAYS.
No. 347,905. Patented Aug. 24, 1886.
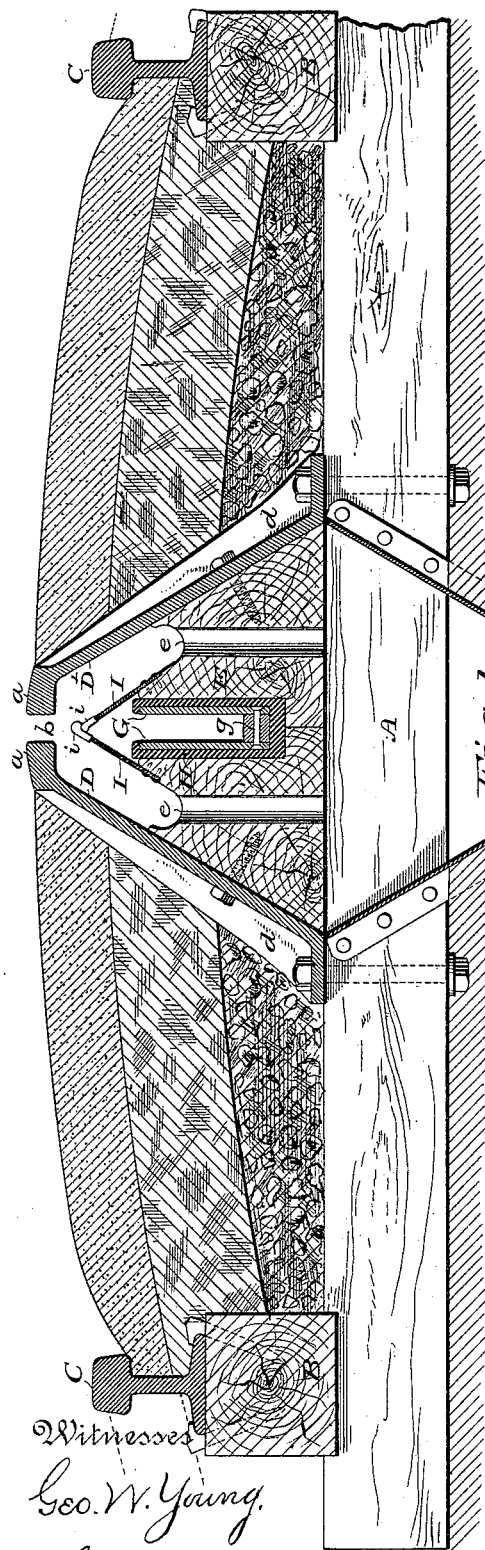
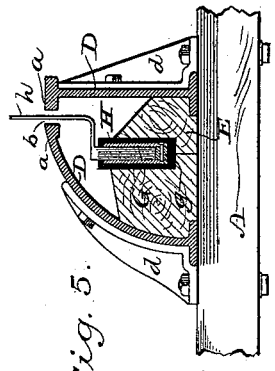
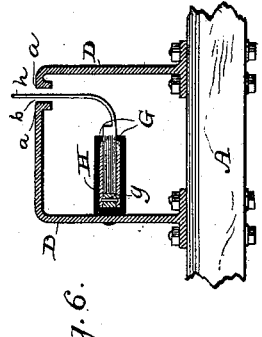
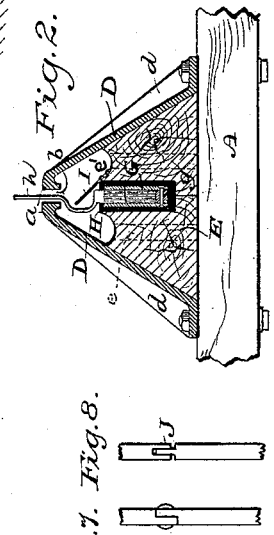
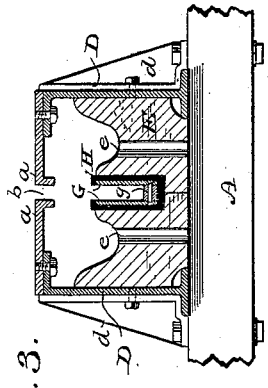
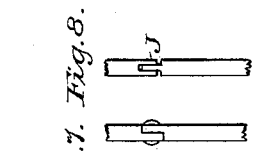
Witnesses
Geo. W. Young.
Henry A. Lamb.
Inventor
Charles J. Van Depoele.
By his Attorneys
James T. Kinkle.
N. PETERS, Photo-Lithographer, Washington, D. C.

UNITED STATES PATENT OFFICE.

CHARLES J. VAN DEPOELE, OF CHICAGO, ILLINOIS.

UNDERGROUND CONDUIT FOR ELECTRIC RAILWAYS.

SPECIFICATION forming part of Letters Patent No. 347,905, dated August 24, 1886.

Application filed April 28, 1886. Serial No. 200,470. (No model.)

*To all whom it may concern:*

Be it known that I, CHARLES J. VAN DEPOELE, a citizen of the United States, residing at Chicago, in the county of Cook, State of Illinois, have invented certain new and useful Improvements in Underground Conduits for Electric Railways, of which the following is a description.

The present invention relates to improvements in underground conduits for electric railways of the class in which one or more electric conductors are permanently mounted within a conduit or trough below the level of the roadway, electrical connection between the conductors and the vehicles moving upon the track being established through an arm attached to and depending from the moving vehicle, and extending downward through a continuous slit along the upper side of the conductor, the lower extremity of the arm being provided with a contact-brush, roller, or equivalent device, through which contact is established with the subterranean conductor or conductors and the moving vehicle.

The details of construction and arrangement of my improvements will be hereinafter fully described and set forth.

In the accompanying drawings, which form part of this specification, Figure 1 is a transverse sectional view of the permanent way of an electric railroad embodying my invention. Figs. 2, 3, 4, 5, 6 are transverse sections through the conduit and conductor, and illustrate some of the modifications of which the construction and arrangement thereof are capable. Fig. 7 is a detail illustrating the method of connecting the sections or plates of which the sides of the conduit are constructed. Fig. 8 shows a slip-joint which is provided in a few of the sections along the road for the purpose of preventing injury to the conduit by expansion and contraction.

Similar letters denote like parts throughout.

In the drawings, A represents a railway cross-tie, near the extremities of which are placed longitudinal stringers B, upon the upper sides of which the rails C are secured in the usual and well-known manner. The conduit for the reception and protection of the electrical conductors is located midway between the rails and conduits of the side sections, D, which are preferably of cast-iron, provided with rib $d\ d$ along their exterior at appropriate distances apart, and formed somewhat thicker at their upper edges, $a\ a$, which, being at all times exposed, have to sustain the weight of the loaded vehicles that may pass thereover. These sections are rendered continuous by being lapped and riveted or bolted together, as indicated in Fig. 7, and they are mounted upon and securely bolted to the cross-ties A. Blocks E, preferably of wood, which have been creosoted or otherwise rendered durable, are placed within the conduit, resting upon the cross-ties A, and to these blocks the sides D are firmly secured, as well as upon the cross-ties. These blocks E may, if found desirable, extend along the entire length of the permanent way, in which case they are provided with vertical drip-holes $e$; but they are preferably used in short sections only, each section discharging whatever moisture may form or accumulate thereon into the space between their ends.

F represents a second set of side pieces, which are secured continuously below the cross-ties A, forming a continuous gutter or trough for the reception of all moisture entering the conduit proper, and this trough is provided with sewer-connections $f$, or other suitable means of discharge, at the points where the water accumulates. Creosoted timber or metallic side pieces may be used for this portion of the conduit.

The electrical conductor is formed in the shape of a trough, the side pieces, G, thereof being preferably of iron, thereby providing sufficient strength and rigidity to enable the conductor to support itself in the intervals between the cross-ties. The iron side strips, G, are securely and permanently attached to a copper bar, $g$, which forms the lower portion of the grooved conductor. This composite conductor is carefully covered on its three outer sides by insulating material H, which is preferably formed of stout fabric soaked in bitumen or other insulating substance. The blocks E (themselves insulators) are grooved along their central portions for the reception of the insulated composite conductor, which is firmly secured in said groove in a position extending slightly above the blocks E, which are sloped off toward the sides of the conduit, so as to form gutters $e'$, adapted to carry moisture away from the center, ultimately discharging it into the drain below, either through the drip-holes $e$ or over the ends of the blocks E, as described.

In order to prevent moisture—such as rain and snow—from entering and filling up the grooved conductor, a cover is provided, which consists of continuous strips of flexible material I, which are secured one on each side of the conductor, so that their upper edges will come together, forming a continuous roof or cover therefor, which will be easily forced open by the passage of the conducting-arm depending from the moving vehicle, and thus close automatically after it has passed. These strips should be protected at their upper edges by a facing of steel, $i$, so that the friction of the contact-arm will not destroy them. In Fig. 2 is shown a modification, in which the roof I is stationary, being fixed at one side of the conductor and extending obliquely thereover, so that anything falling through the slit $b$ would be caught by said roof and carried to the gutter $e'$ on one side. With this construction the contact-arm $h$ is curved after its entrance into the conduit, so as to pass around the edge of the roof and then back toward the center until its lower extremity is directly under the slit $b$ and the contact-brush carried thereby in working position in the grooved conductor.

In Fig. 3 is shown a form for the sides of the conduit, which admits of a more ready construction of rolled iron or steel. The roof of the conductor is, for convenience, here omitted.

In Fig. 4 two conductors are shown set at such an angle that they may be conveniently placed at the sides of the conduit, leaving the center clear for the reception of the water falling through the slit $b$. The presence of two conductors of course dispenses with the use of the track as a return, which is the usual arrangement, and preferable on the score of economy.

In Fig. 5 is shown another arrangement. This is also for a single conductor, which, on account of the shape of the conduit, is placed entirely under one side thereof, and in that manner escapes the drip from the slit $b$.

In Fig. 6 a further modification is shown, by which I am enabled to place the conductor with its groove in a horizontal instead of vertical position. This of course most effectually prevents the entrance of water thereinto, and it will be obvious that this arrangement might also be applied to the form of conduit shown in Fig. 3, one conductor being secured on either side. With any or all of these constructions the construction of the roadway remains substantially the same, the drain F being provided to carry away the water entering through the slit $b$, and the space between the cross-ties, the sides of the conduit, and the rails being filled with suitable material—such as broken stone and concrete—and in the case of a city street topped off with a surface of asphaltum, which rises toward the center of the track, making it sufficiently higher to deflect all moving water toward the rails and away from the open slit. The expansion-joint J is used wherever it may be found necessary to secure the integrity of the system, and the side walls, D D, whether of cast or wrought iron, when lapped, as shown in Fig. 7, and bolted or riveted together, impart to the conduit as a whole the greatest possible solidity and permanence.

Suitable openings should be provided at points along the roadway, whereby access can be had to the conduit and drains for the purpose of removing any obstructions that may accumulate and impede the working of the system.

I do not confine myself to the exact details herein described, since various modifications and changes may be made without in any way departing from the spirit of the invention.

Having described my invention, what I claim, and desire to secure by Letters Patent, is—

1. An underground conduit for electric conductors, consisting of rigid metallic sides, central insulating supports or blocks, to which the sides are secured, and an electric conductor mounted upon the central support, as set forth.

2. In an underground conduit, the combination of rigid metallic sides, a solid central support, against which the sides rest, an electric conductor mounted on the central support, and a continuous roof or cover therefor, substantially as shown and described.

3. In an underground conduit, the combination of rigid metallic sides, a solid central support, against which the sides rest, a grooved electric conductor mounted in the central support, a continuous roof or cover secured to the support and extending over the groove in the conductor, and a continuous gutter or drain extending below the central support, substantially as shown and described.

4. In an underground conduit, the combination of the central supports, the rigid metallic sides, and the depending gutter, substantially as shown and described.

5. In an underground conduit, the combination of the cross-tie, the blocks E, the rigid metallic sides D, secured thereto and resting thereagainst, a conductor mounted in the blocks E, and the gutter F, depending from and extending below the said supports, substantially as shown and described.

6. In an underground conduit, the combination, with suitable supports therefor, of the metallic sides D, having the re-enforced lips $a$ and the ribs $d$, substantially as shown and described.

7. In an underground conduit for electric railways, a grooved conductor formed of side pieces riveted or fastened to a bottom piece, and an insulation placed around the outside of the conductor, preventing metallic or electric contact therewith, substantially as shown and described.

8. In an underground conduit for electric railways, a conductor made of two side pieces of metal having a copper bottom piece, all riveted or fastened together, and an insulation placed around the compound conductor, preventing metallic or electric contact with the outside of the conductor, substantially as described.

In testimony whereof I hereto affix my signature in presence of two witnesses.

CHARLES J. VAN DEPOELE.

Witnesses:
J. TAYLOR ROBERTS,
EDWIN B. JOSEPH.